April 9, 1935.    W. L. DOUDEN    1,997,410
MOTION PICTURE MACHINE
Filed March 5, 1931
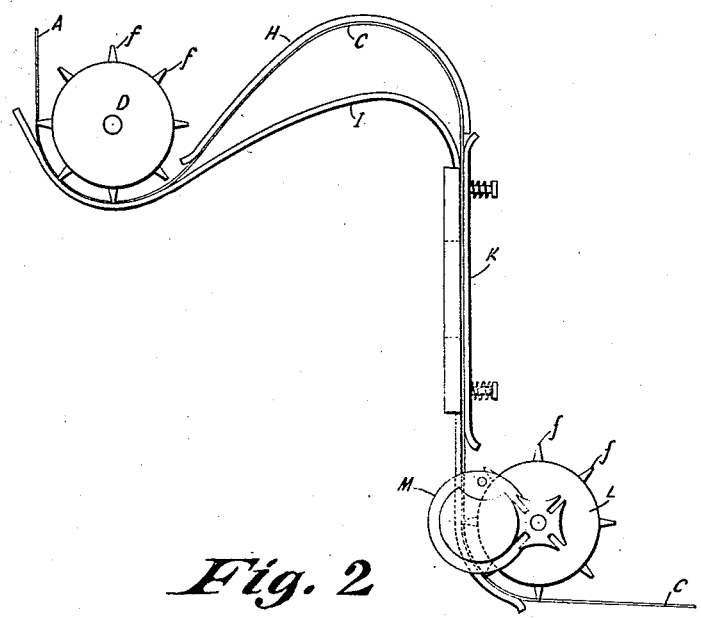
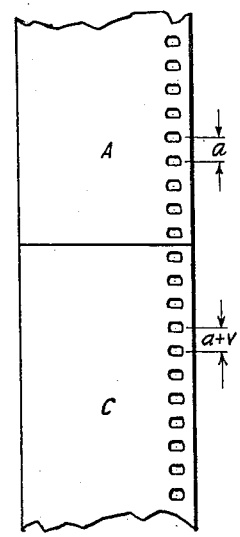
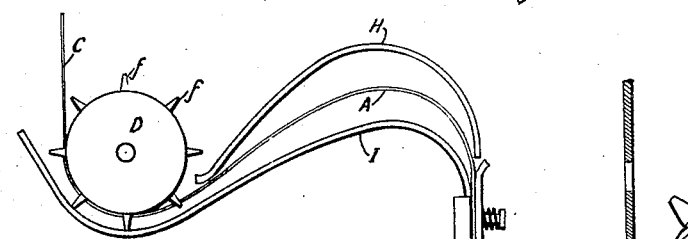
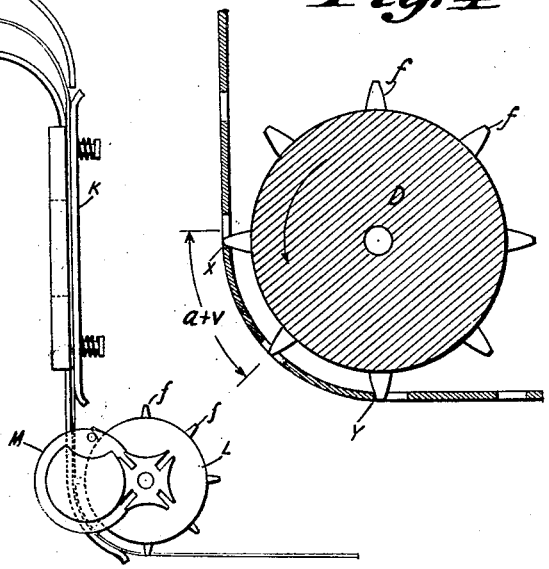
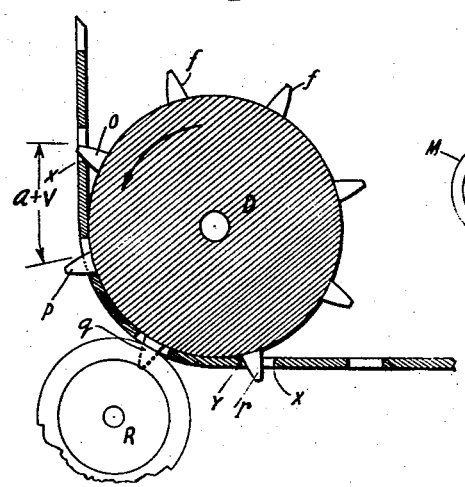
INVENTOR
W. L. DOUDEN
BY
ATTORNEY Patented Apr. 9, 1935

1,997,410

UNITED STATES PATENT OFFICE 1,997,410

MOTION PICTURE MACHINE

William L. Douden, Brooklyn, N. Y., assignor to Radio Corporation of America, a corporation of Delaware Application March 5, 1931, Serial No. 520,311

8 Claims. (Cl. 88—18)

The present invention relates to motion picture apparatus such as cameras or projectors, and more particularly to that type of such apparatus in which the film is automatically threaded therethrough.

More particularly, this present invention relates to that type of self-threading motion picture apparatus in which the film is threaded endwise through the mechanism of such apparatus.

The present invention relates most particularly to the formation of the film loop which is necessary in the operation of various motion picture apparatus due to the intermittent motion of the film through a portion of such apparatus as will be discussed more fully hereinafter.

In motion picture projectors and cameras, it is necessary to move the film intermittently past a picture gate or aperture in which aperture the film is exposed to the influence of the light passing through the lens as in a camera or at which point the projection of the image of the film, upon a screen, in the case of a motion picture projector, takes place. The film, however, in passing from and to the supply and take-up reels respectively must be moved continuously. This is necessitated by the considerable mass of the reels and the film accumulated thereon because of which it is impractical to move them in an intermittent manner. Thus the common practice is to provide continuously rotating sprockets for passing the film from the supply reel and for passing the film to the take-up reel in such motion picture apparatus as is under discussion. Continuously rotating sprockets are thus arranged on each side of the intermittent sprocket or other intermittent film moving devices provided for moving the film in an intermittent manner past the picture gate. It is thus seen that a varying loop of film must be formed between each of these continuously rotating sprockets, and the intermittent device in order to compensate for the differences in the motion of the film past these respective mechanisms. In feeding a film through a motion picture camera or projector, it is therefore necessary that the film be disposed in loops at these points. The adjustment of these loops must be made quite carefully in order that a tension will never exist on the film between the sprockets which would cause the sprocket holes in the edges of the film to tear out. It is also important that the loop be limited in size so that the film will not interfere with or be scratched by the various parts of the camera or projector.

In automatic or self-threading cameras or projectors, it has been customary to pass the film through channels which form it into approximately the shape of the loop desired. After the threading operation is completed, the sides of the channels or guides are released to permit a free variation of the loop size during the operation of the device.

Various other systems have been devised in which the speeds of the various sprockets are retarded or accelerated in accordance with the size of the loop or the tension of the film in order to permit the proper loop size to be maintained at all times as well as in order to permit the original formation of the loops of the proper size.

All of these systems require a considerable number of moving parts and a considerable complication of the structure of the camera or projector results. This complication not only increases the expense of the apparatus but increases the operating difficulties.

It is the object of the present invention to construct a motion picture projector or camera in which the film may be fed through the mechanism automatically.

It is a further object of the present invention to obviate each of the above noted difficulties by providing a projector or camera of the endwise threading type in which the loops required for the operation thereof are formed without the necessity of mechanical motions of any sort.

A further object of this invention is to provide a new and improved system for the self-threading of motion picture film through a camera or projector mechanism.

These and various other objects of my invention will become apparent from the following specification taken in connection with the appended drawing.

In accomplishing the objects of my invention, I provide a leader strip, the sprocket holes of which are disposed at geater intervals than that of those on the usual film. This film is fed through the machine making use of the usual sprockets. The increase in spacing of the sprocket holes is such that the leader strip will engage the desired number of sprocket teeth, as for instance three as shown and described. The engagement, however, is such that the film will tend to slip or be accelerated in the direction of rotation of the sprocket and will move faster than a film having the usual sprocket hole spacing. It can be seen that the increased spacing of the sprocket holes causes the leader strip to advance the same number of sprocket holes in a given interval but at a greater linear speed than the regular film. Thus, when the film is fed through fixed guides, and the leader strip passes the first sprocket, the speed of the film passing over said sprocket is less than the speed of the leader strip passing over the next sprocket, and as a consequence the loop of film between said sprockets will be shortened so as to leave the guide which formed it, and there is thus formed a loop which is free to vary in each direction the proper amount required for the differences in motion of the sprockets concerned.

It is obvious that in the leader strip, both the spacing of the sprocket holes and the size thereof in the direction of the length of the film, may be increased. The increase in the size of the sprocket holes is such that the leader passing the ordinary sprocket will not be caused to ride out on the teeth but may be pressed against the sprocket by means of the usual pressure roller. However, the spacing of the sprocket holes will cause the film to creep in the direction of rotation of the sprocket, as will be discussed more fully hereinafter, so that the linear speed of the leader portion is greater than the speed of the normal film. The effect obtained under these circumstances is the same as if the film were permitted to ride out on the sprocket teeth, and the speed of the film over the first of the two sprockets, the regular film being on the last sprocket, is greater than the linear speed of the film over the second sprocket so that the film will be pulled away from the guide whether the film leader is permitted to ride out on the sprocket teeth or is held down by pressure rollers. This last mentioned arrangement would be employed particularly with machines of the usual design in view of the fact that a pressure roller is generally used to hold the film against the sprocket.

Having thus briefly described my invention, attention is invited to the accompanying drawing in which;

Fig. 1 is a diagram showing the leader strip passing over the first loop forming position;

Fig. 2 shows the formation of the loop as the leader passes the second sprocket;

Fig. 3 is a diagram representing the film and the leader strip;

Fig. 4 is a cross section of a sprocket showing the leader strip of one form of my invention passing thereover;

Fig. 5 is a cross section of a sprocket showing the leader strip passing said sprocket when the usual pressure rollers are used in conjunction therewith.

Attention is now invited more particularly to the drawing in which like parts are designated by like reference figures. Figs. 1 and 2 represent the portion of the film path from the take-off sprocket which pulls the film from the film supply reel down to the picture gate and supplies it to the intermittent sprocket.

These two figures are adapted to describe the method by which the free loop is formed above the picture gate, but it is to be understood that the method covered is not restricted to this single use and that similar provisions may be made to form loops in each of the positions required throughout the passage of a film through the machine. As an example, it is desirable to form a loop below the picture gate. In a talking motion picture machine, it might also be desirable to form a loop between a sprocket which is used to move a sound record film past the sound reproducing apparatus, and the hold back sprocket which supplies the film with the lower take-up reel. Such a loop prevents irregularities of the film motion due to the lower reel being transmitted back through the film to the sound reproducing point and causing thereby a distortion in the sound being reproduced.

Referring now more particularly to Fig. 3, the portion of the film shown at A represents a standard motion picture film on which the picture and sound track have been printed ready for projection and sound reproduction. The distance between the sprocket holes in this portion of the film is the standard as indicated at A. It will be noted that a leader strip of film C has been provided. This leader strip may be spliced and attached in any way to the usual leader or to the film itself in place of the usual leader strip. This section of the film leader passes through the mechanism initially, pulling with it the standard film or leader A. The spacing of the sprocket holes in C is greater than the standard by an amount $v$, the spacing thus being represented as $a+v$.

As shown in Figs. 1 and 2, the sprocket D is provided with teeth $f$ of the usual design, and a similar sprocket L is provided in combination with the intermittent generally indicated at M.

Fixed guide means H and I are provided to guide the film from the sprocket D to the gate K. At the lower end of the gate K is also provided means to guide the film from the lower end of said gate to the intermittent sprocket L.

Having thus described the elements comprising my invention, I will now describe its operations. The leader which is in the form shown in Figs. 2–4, (viz. having standard sprocket holes with increased spacing), is inserted between the rotating sprocket D and the guide I. The teeth $f$ engage the sprocket holes of the leader strip and the film is thereby passed through the guide around the sprocket D riding out on the ends of the teeth as indicated more clearly in Fig. 4. This position of the film is due to the increased interval between the sprocket holes, the distance between the edge X of one sprocket hole and the edge Y of the second adjacent sprocket hole being so great that the film cannot ride down on the sprocket. The film is thus fed between the guides H and I down to the picture gate K to the sprocket L where a corresponding set of teeth $f$ engage the sprocket holes in the film. In its passage through the gate K, the film encounters the resistance due to the spring pressure of the gate upon the film, and is held back thereby. This causes the film to ride up against the guide H which defines the longest possible path and thus determines the ultimate size of the loop being formed.

As the film is fed through the guides and gate from the sprocket D to the sprocket L, it is to be understood that the number of sprocket holes in the film therebetween is fixed by virtue of the fact that when the leader is passing through, the number of spaces is maintained by the film engaging with the teeth $f$ without any slipping. However, when the standard film is on sprocket D and the leader is on sprocket L, as shown in Fig. 2, the spacing of the sprocket holes in the regular film being less than the spacing in the leader, the total length of the standard film A passed in a given time by sprocket D is less than the total length of the leader film C passed by the sprocket L in the same time, and the film is therefore pulled from the guide H and is permitted to function as a normal loop according to the requirements set forth above.

Referring now more particularly to Fig. 5, which shows the preferred form of my invention, the leader strip C in addition to having the sprocket holes thereof at a distance of $a+v$ has the sprocket holes themselves extended in the direction of the motion of the film so that the film may ride in contact with the sprockets D and L under the pressure of the roller R as shown. However, due to the fact that the leading edge X of the sprocket hole must be moved in the direction of rotation of the sprocket D as it moves from the position at O shown as it first engages the sprocket teeth to the position shown on the next tooth in the position P, and finally to the position shown at $r$, the film creeps in the direction of rotation, and therefore the linear speed of the film in the direction of rotation is greater for the leader than for the standard film. Thus, the film moves through the projector in feeding and the loop is formed in the same manner as that described above in connection with Figs. 1 to 4. This latter described operation, however, is that resulting when my invention is used in the ordinary projector, using the usual pressure roller P, as shown in Fig. 6.

It is to be understood that these operations can be repeated at the different locations as may be desired in the projector or camera as indicated above. It is also to be understood that the usual projecting equipment, such as lenses, light sources, shutters, etc., are provided but that these are not illustrated here as they constitute no part of the present invention.

Further, whereas I have illustrated a film showing a single row of sprocket holes, it is obvious that film having double sprocket holes may be used in connection with the standard projector. It is further obvious that in either case the sprocket holes on the leader must be on one side or on both sides to correspond therewith.

Having thus described my invention, attention is invited to the fact that I have merely shown and described sufficient modifications thereof to properly illustrate it, and that I am therefore not to be limited to the specific embodiments shown, but by the scope of my invention as set forth in the appended claims.

I claim:

1. In a device of the type described, the combination of a film to be threaded through a motion picture projector and having sprocket holes uniformly spaced, a leader strip for said film having the sprocket holes spaced a greater distance than those of said film, fixed guide means within said projector for guiding the film leader strip passing therethrough in the form of a loop, and sprockets at each end of said guide means for feeding the said leader strip and film therethrough.

2. A motion picture apparatus of the self-threading type which comprises a series of rotatable sprockets, a series of fixed guides, and a leader strip attached to the film to be threaded through said apparatus and having sprocket holes spaced at greater distance than those of the said film whereby it is adapted to pass by each of said sprockets at a greater linear speed than the standard film threaded thereby, and whereby when said leader strip has passed said sprockets through said guides, the differential speed between the said leader strip and the standard film will cause the loop formed by said guides to be shortened and removed from contact therewith.

3. A motion picture apparatus of the self-threading type comprising a series of rotatable sprockets, fixed guides between said sprockets, certain of said guides being in the form of loops, and of such shape that the outer surface thereof is adapted to pass the free end of the film in a loop from one sprocket to another sprocket, and the inner surface thereof is sufficiently removed to permit a free loop to be formed therein, a film provided with sprocket holes so spaced as to co-operate with the teeth of said sprockets, and a leader strip attached to said film and provided with sprocket holes so spaced as to co-operate with the teeth of said sprockets but spaced at a greater distance than the sprocket holes of the said film.

4. A film threading device including a film drive means, a second film drive means, and a curved rectangular film guideway interposed between said two drive means and provided with sufficient cross section between a portion concave inwardly and the opposite side of said guideway to permit withdrawal of the film from said concave side and the normal functioning of a loop within said guideway.

5. An apparatus for utilizing a record band including a leader strip section provided with comparatively widely spaced sprocket holes and a film section provided with comparatively closely spaced sprocket holes, said apparatus including a pair of sprockets having teeth so spaced as to cooperate with both of said kinds of sprocket holes, and guide means arranged to cause a free loop to be formed in said band during normal operation of said sprockets.

6. A motion picture film adapted for cooperation with a self-threading motion picture apparatus having fixed guides, comprising a picture carrying portion having sprocket holes spaced at a predetermined distance so that they will cooperate in a normal manner with the sprockets of the apparatus, and a leader strip having sprocket holes spaced at a different distance than those of the picture carrying film, the difference between the distances of the sprocket holes in the leader strip and the distances of those in the film being less than that at which the said sprocket holes of the leader strip would fail to cooperate with the sprocket teeth, whereby the said leader strip and the said picture carrying portion of the film will be fed through the machine at different rates of speed.

7. A motion picture film adapted to be fed through a motion picture machine, comprising a picture carrying portion having means adapted to cooperate with the film feeding means of a motion picture machine for feeding the film through the machine at a predetermined rate of speed, and a leader strip having means adapted to cooperate with the film feeding mechanism of the machine to feed the leader strip through the machine at a higher rate of speed when the said mechanism is operated at the same speed.

8. Film feeding apparatus comprising a plurality of film feeding means adapted to be operated at a constant average speed, a film, means on a portion of said film adapted to co-operate with said feeding means for driving the film at one rate of speed, and means on another portion of said film adapted to co-operate with said film feeding means for driving that portion of the film at a lower rate of speed from that at which the first portion was driven.

WILLIAM L. DOUDEN.